United States Patent
Shaw et al.

(10) Patent No.: US 9,781,593 B2
(45) Date of Patent: Oct. 3, 2017

(54) METHOD AND APPARATUS FOR DATA MANAGEMENT OF THIRD PARTY SERVICES

(71) Applicant: AT&T INTELLECTUAL PROPERTY I, LP, Atlanta, GA (US)

(72) Inventors: Venson Shaw, Kirkland, WA (US); Sangar Dowlatkhah, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/004,268

(22) Filed: Jan. 22, 2016

(65) Prior Publication Data
US 2016/0142904 A1    May 19, 2016

Related U.S. Application Data

(63) Continuation of application No. 14/313,566, filed on Jun. 24, 2014, now Pat. No. 9,270,815.

(51) Int. Cl.
*H04W 8/20* (2009.01)
*H04M 3/42* (2006.01)
(Continued)

(52) U.S. Cl.
CPC ......... *H04W 8/20* (2013.01); *H04M 3/42144* (2013.01); *H04W 4/16* (2013.01); *H04W 72/0406* (2013.01); *H04M 2203/6009* (2013.01)

(58) Field of Classification Search
CPC .... H04M 3/42144; H04W 8/20; H04W 8/205
See application file for complete search history.

(56) References Cited

U.S. PATENT DOCUMENTS

| 4,901,340 A | 2/1990 | Parker et al. |
| 5,440,614 A | 8/1995 | Sonberg et al. |

(Continued)

FOREIGN PATENT DOCUMENTS

| CN | 101540984 A | 9/2009 |
| EP | 2512164 A1 | 10/2012 |

(Continued)

OTHER PUBLICATIONS

Ballot, et al., "Simplifying the User Experience while Enabling the Profitable Evolution to All-IP Mobile Transport," enriching communications, vol. 2, issue 1, 2008.

(Continued)

*Primary Examiner* — Christopher M Brandt
(74) *Attorney, Agent, or Firm* — Guntin & Gust, PLC; Jay Anderson

(57) ABSTRACT

Aspects of the subject disclosure may include, for example, a method comprising caching, by a server comprising a processor, a subscriber profile in a network repository to create a cached subscriber profile. The cached subscriber profile comprises a replica of stored subscriber data. The method also comprises updating the cached subscriber profile in accordance with subscriber use of a first application from a first application provider to produce a first updated version of the cached subscriber profile. The method further comprises updating the first updated version of the cached subscriber profile in accordance with subscriber use of a second application from a second application provider to produce a second updated version of the cached subscriber profile. The first and second updated versions of the cached subscriber profile are accessible by the first application provider and by the second application provider. Other embodiments are disclosed.

20 Claims, 10 Drawing Sheets

(51) Int. Cl.
*H04W 4/16* (2009.01)
*H04W 72/04* (2009.01)

(56) References Cited

U.S. PATENT DOCUMENTS

| | | | |
|---|---|---|---|
| 6,067,454 | A | 5/2000 | Foti |
| 6,119,001 | A | 9/2000 | Delis et al. |
| 6,226,364 | B1 | 5/2001 | O'Neil |
| 6,697,806 | B1 | 2/2004 | Cook et al. |
| 6,725,037 | B1 | 4/2004 | Grootwassink |
| 6,810,259 | B1 | 10/2004 | Zhang |
| 7,289,805 | B2 | 10/2007 | Tom et al. |
| 8,090,368 | B2 | 1/2012 | Chambers et al. |
| 8,374,578 | B2 | 2/2013 | Ylikoski |
| 8,532,673 | B2 | 9/2013 | Walker et al. |
| 8,554,876 | B2 | 10/2013 | Winsor et al. |
| 8,601,218 | B2 | 12/2013 | Dowlatkhah |
| 2002/0131404 | A1 | 9/2002 | Mehta et al. |
| 2003/0009495 | A1 | 1/2003 | Adjaoute et al. |
| 2003/0131259 | A1 | 7/2003 | Barton et al. |
| 2003/0200277 | A1 | 10/2003 | Kim |
| 2003/0211844 | A1 | 11/2003 | Omori et al. |
| 2006/0059265 | A1 | 3/2006 | Keronen |
| 2007/0011261 | A1 | 1/2007 | Madams et al. |
| 2008/0015878 | A1 | 1/2008 | Feng et al. |
| 2008/0256020 | A1 | 10/2008 | Wakefield |
| 2008/0256298 | A1 | 10/2008 | Lu et al. |
| 2008/0316925 | A1 | 12/2008 | Dolin et al. |
| 2009/0029697 | A1 * | 1/2009 | Bianconi .................. H04W 8/20 455/432.3 |
| 2009/0182836 | A1 | 7/2009 | Aviles et al. |
| 2009/0305674 | A1 | 12/2009 | Teittinen et al. |
| 2012/0290795 | A1 * | 11/2012 | Dowlatkhah ..... G06F 17/30566 711/136 |
| 2013/0109348 | A1 * | 5/2013 | Sharma .................. H04W 12/08 455/411 |
| 2013/0276072 | A1 | 10/2013 | Matti et al. |
| 2014/0101449 | A1 | 4/2014 | Trujillo Gonzalez et al. |
| 2014/0137265 | A1 | 5/2014 | Dubman et al. |
| 2014/0150067 | A1 | 5/2014 | Salkintzis et al. |

FOREIGN PATENT DOCUMENTS

| | | |
|---|---|---|
| EP | 2536103 A1 | 12/2012 |
| WO | 2004030293 A1 | 4/2004 |
| WO | 2008149101 A3 | 6/2009 |

OTHER PUBLICATIONS

Gondi, et al., "Users and Network Management for Secure Interworking and Roaming in WiMAX, 3G and Wi-Fi Networks Using RII Architecture," Novatica, Upgrade vol. IX, No. 6, Dec. 2008.

Kambalakatta, et al., "Profile based Caching to Enhance Data Availability in Push/Pull Mobile Environments," IEEE, Proceedings of the First Annual International Conference on Mobile and Ubiquitous Systems: Networking and Services (MobiQuitous'04).

Telektronikk, , "Future Mobile Phones," vol. 101 No. 3/4, 2005.

* cited by examiner

100

200

300

600

METHOD AND APPARATUS FOR DATA MANAGEMENT OF THIRD PARTY SERVICES

CROSS-REFERENCE TO RELATED APPLICATION(S)

This application is a continuation of U.S. application Ser. No. 14/313,566, filed Jun. 24, 2014, which is incorporated herein by reference in its entirety.

FIELD OF THE DISCLOSURE

The subject disclosure relates to a method and apparatus for data management of third-party services, to facilitate provision of third-party services to subscribers via a network.

BACKGROUND

A network provider typically offers a platform for third parties to deliver services and applications to network subscribers. This platform should be provided without jeopardizing the integrity of subscribers' personal data or service providers' databases.

BRIEF DESCRIPTION OF THE DRAWINGS

Reference will now be made to the accompanying drawings, which are not necessarily drawn to scale, and wherein.

DETAILED DESCRIPTION

Figure 1:
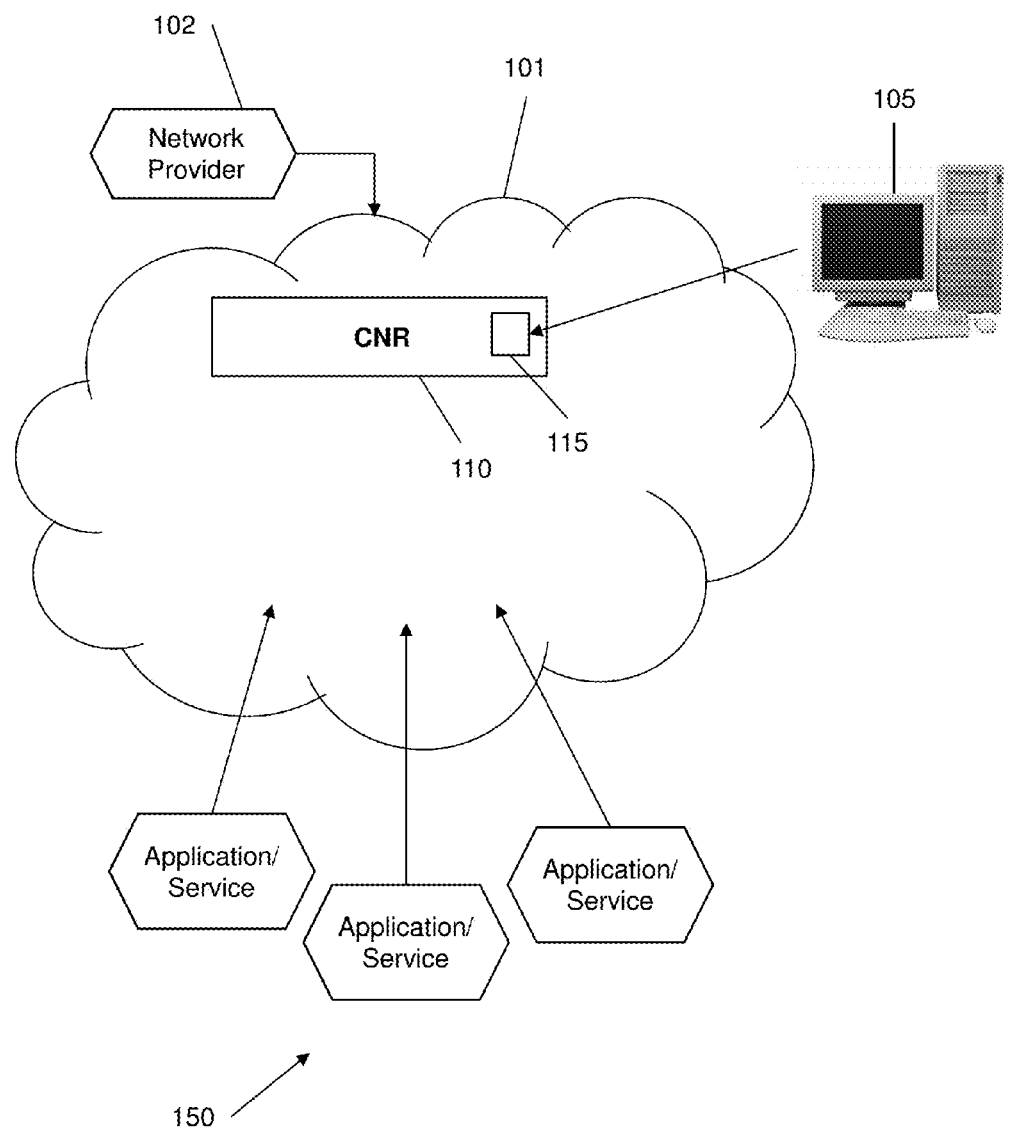
FIG. 1 depicts an illustrative embodiment of a communications network having subscribers and third-party application providers.

The subject disclosure describes, among other things, illustrative embodiments for dynamic caching of network subscriber profiles to provide data management for subscriber data and third-party applications. Other embodiments are described in the subject disclosure.

One or more aspects of the subject disclosure include establishing a cache function in a shadow consolidated network repository, so that a cached replica of a subscriber profile can be retrieved and updated by a third-party agent without jeopardizing the integrity of the subscriber data.

One embodiment of the subject disclosure includes a server comprising a memory to store instructions and a processor coupled to the memory. The processor, responsive to executing the instructions, performs operations. The operations comprise storing subscriber data and network data in a first repository of a communication network of a network provider. The subscriber data is obtained from equipment of a subscriber to the communication network. The operations also comprise facilitating establishing a second repository in communication with the first repository and accessible by a first application provider, and caching a subscriber profile in the second repository to create a cached subscriber profile. The cached subscriber profile enables updating in accordance with subscriber use of a first application to produce a first updated version of the cached subscriber profile. The cached subscriber profile comprises the subscriber data from the first repository and information related to the subscriber use of the first application from the first application provider. The first updated version is accessible by the first application provider. Access to the subscriber data in the first repository by the first application provider is prevented.

One embodiment of the subject disclosure includes a non-transitory computer-readable storage device comprising instructions. The instructions, when executed by a processor, cause the processor to perform operations. The operations comprise caching a subscriber profile in a network repository to create a cached subscriber profile. The cached subscriber profile comprises a replica of stored subscriber data. The operations also comprise updating the cached subscriber profile in accordance with subscriber use of a first application from a first application provider to produce a first updated version of the cached subscriber profile. The first updated version is accessible by the first application provider. Access to the stored subscriber data by the first application provider is prevented.

One embodiment of the subject disclosure includes a method comprising caching, by a server comprising a processor, a subscriber profile in a network repository to create a cached subscriber profile. The cached subscriber profile comprises a replica of stored subscriber data. The method also comprises updating, by the server, the cached subscriber profile in accordance with subscriber use of a first application from a first application provider to produce a first updated version of the cached subscriber profile. The method further comprises updating, by the server, the first updated version of the cached subscriber profile in accordance with subscriber use of a second application from a second application provider to produce a second updated version of the cached subscriber profile. The first updated version of the cached subscriber profile and the second updated version of the cached subscriber profile are accessible by the first application provider and by the second application provider.

FIG. 1 schematically illustrates a system 100 for providing applications and delivering services to subscribers to a network. As shown in FIG. 1, network 101 is provided and maintained by network provider 102 and can be accessed by equipment 105 of subscribers to the network. The subscriber equipment also can communicate with third-party providers 150 of various applications and services over network 101.

The network architecture provides for a consolidated network repository (CNR) 110. The CNR serves as a platform for centrally storing, accessing, retrieving and updating subscriber and network data. In particular, the CNR can store information 115 regarding each subscriber (e.g. demographic data, present location, media viewing habits, purchasing preferences, etc.). This information is generally referred to as a subscriber profile. In this embodiment, access to the subscriber profile is restricted to trusted parties only, in order to protect the integrity of the data and to prevent unauthorized disclosure. Specifically, non-trusted parties including the third-party agents (application and service providers) 150 are prevented from accessing or retrieving subscriber profiles stored in the CNR.

Figure 2:
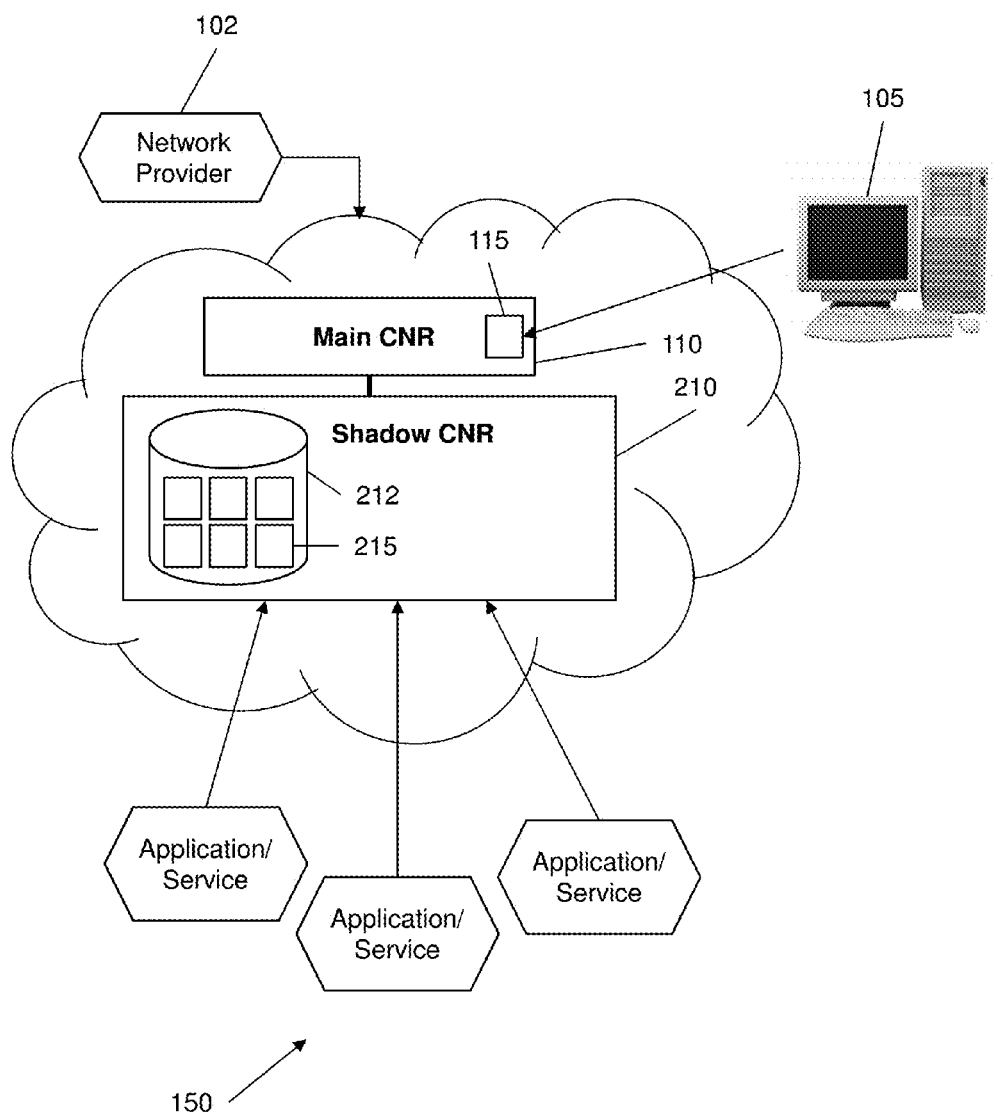
FIG. 2 depicts an illustrative embodiment of a communications network including a main consolidated network repository (CNR) and a shadow CNR.

FIG. 2 schematically illustrates a system 200 in which CNR 110 is linked to a shadow CNR 210 that includes a database 212. Details of the shadow CNR are discussed in U.S. application Ser. No. 14/134,126, which is incorporated herein by reference in its entirety. Database 212 can store information 215 for each subscriber using a given service. In an embodiment, a set of specific parameters for each subscriber is stored in database 212 for each service. If the network provider 102 or one of the third-party agents 150 offers a new service, a new database is accordingly provided with a set of parameters for each subscriber using the service.

Database 212 can be made available to application and service providers globally while maintaining the security of the data, since data in the main CNR is not affected by accessing, retrieval or updating activity in the shadow CNR. In this embodiment, a third-party agent 150 can access database 212 of shadow CNR 210 to obtain information 215 regarding a subscriber using a specific service, but is not permitted to alter the information. In other embodiments, a third-party agent may be permitted to retrieve and update a subscriber profile.

Figure 3:
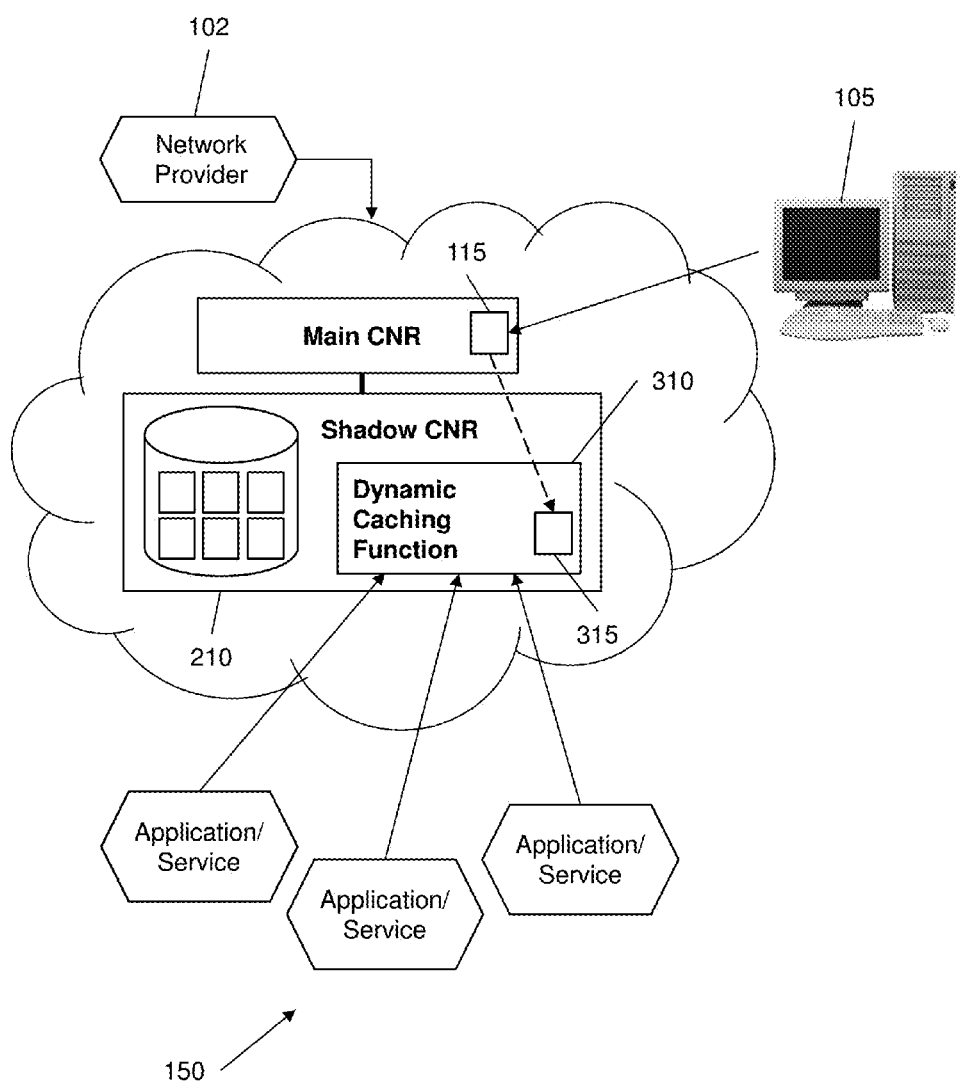
FIG. 3 depicts an illustrative embodiment of a communications network including a dynamic caching function in a shadow CNR, in accordance with the disclosure.

FIG. 3 illustrates a network 300 with a shadow CNR in which the shadow CNR 210 is provided with a dynamic caching function 310, in accordance with an embodiment of the disclosure. As shown schematically in FIG. 3, the caching function 310 temporarily stores a subscriber profile 315 that imports data from the subscriber profile 115 of the main CNR. In this embodiment, the cached subscriber profile 315 can be retrieved and modified by the third-party agents 150, thereby creating new versions of the cached profile. The original and new versions are stored in a cache layer of the shadow CNR, which serves as an intermediate data management layer between the CNR and the third-party agents. This arrangement permits subscriber data to be accessed by third parties while maintaining the integrity of the data. The subscriber data in the main CNR remains isolated from the third-party agents, which are not permitted to access or retrieve profile 115.

Since a variety of data management functions can be performed in the cache and multiple versions of the subscriber profile can be maintained in the cache, the dynamic caching function 310 can reduce traffic between the main CNR 110 and the shadow CNR 210. In addition, since the shadow CNR interfaces to various elements of the network 101, the dynamic cache function can control the quality and consistency of transactions between the shadow CNR and the various elements of the network.

Figure 4:
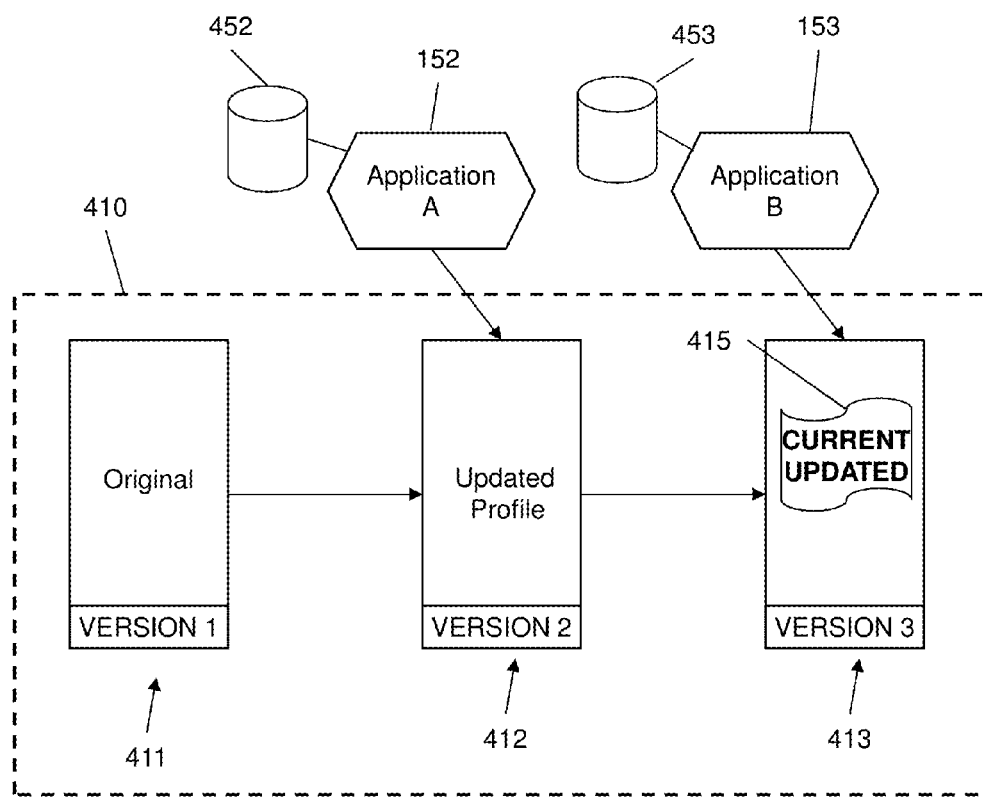
FIG. 4 schematically illustrates multiple versions of cached subscriber profiles accessed by third-party application providers in the shadow CNR, in accordance with an embodiment of the disclosure.

FIG. 4 schematically illustrates an embodiment 400 of the disclosure including a shadow CNR cache layer 410 in which multiple versions of a subscriber profile are created, accessed, retrieved and modified by third-party application providers. The original version 411 is a temporary copy of the subscriber profile maintained in the main CNR. As shown in FIG. 4, application "A" 152 (for example, a banking application) can retrieve and update the profile, thus creating a second version 412. A different application "B" 153 then can retrieve and update the latest version of the profile and thus create a third version 413. Each version is marked with a version number. Furthermore, in an embodiment, the caching function monitors the changes being made to each profile and attaches a label or flag 415 to the latest (most recently updated) version. An application can determine whether it has retrieved the latest version according to the presence of the flag. The flag serves as a trigger to inform the subscribed services of the most recent changes to a profile.

Different application providers 152, 153 will typically maintain databases with different customer data schemes. For example, a network subscriber with profile 115 who is a customer in both a banking application and an entertainment application will have customer records in databases 452, 453 respectively. Since the applications have different functions, the data schemes for a given customer in databases 452, 453 will be different. In order to ensure that each application has access to the most recent version of the subscriber profile, the dynamic caching function propagates the current version to the various applications, including applications that do not have the current version. In an embodiment, this can be done using an Open API (Application Program Interface) to push profile changes to all application and service providers, independently of the specific data scheme for a given provider. For example, if application 152 is a subscriber's home security service and application 153 is a social networking application, a subscriber may update her location via application 153 so that version 413 has a more current location than version 412. The Open API can propagate the most recent version, including the current subscriber location, to the home security service application 152.

Changes to the cached subscriber profile are made in accordance with data management policies established by the network provider 102. In an embodiment, the policies are implemented by the main CNR 110, so that the main CNR controls requests to update a cached subscriber profile. The main CNR can discard a profile version, or deny a request, if it is not in accordance with the policies. Since older versions of a profile are not automatically discarded, the last version in accordance with the policies can be relabeled as the current version. Similarly, if an error in the latest version is discovered, that version can be discarded and a previous version relabeled as the current version.

It will be appreciated that multiple cache layers can be established for the shadow CNR. Accordingly, a multiple layer caching management scheme can be implemented for the cached subscriber data, wherein hierarchies of layers are provided. This also permits multiple sessions to be simultaneously set up and/or terminated for access and retrieval of the cached data by multiple and simultaneous third party agents (application/service providers).

It will be appreciated that the dynamic caching function of the shadow CNR can also provide a cached version of a database residing in the main CNR. For example, a home location register (HLR) of the network can be linked to a supplementary database that includes the status of third party agents with respect to the home location register. The caching function can monitor changes to a cached version of this supplementary database. Once those changes are completed and verified, the caching function can return the latest version of the database to the main CNR.

Figure 5:
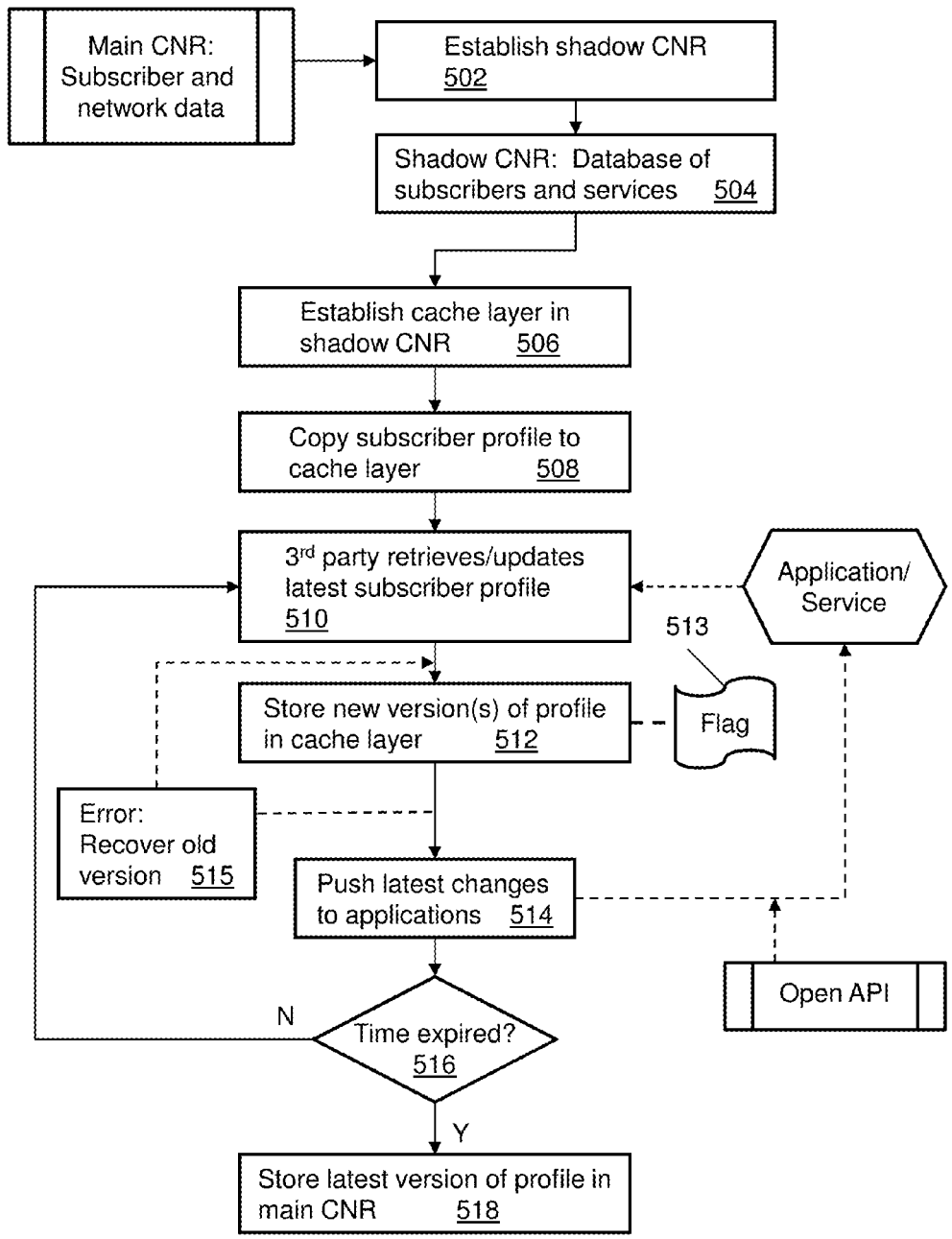
FIG. 5 is a flowchart illustrating a procedure in which subscriber profiles in a cached layer of the shadow CNR can be accessed and updated, in accordance with an embodiment of the disclosure.

FIG. 5 is a flowchart illustrating a procedure 500 in which a cached layer of the shadow CNR is established and subscriber profiles therein are retrieved and updated, in accordance with an embodiment of the disclosure. The shadow CNR is established in communication with the main CNR (step 502) and provides a database of subscribers and services (step 504). A cache layer, with a dynamic cache function, is then established in the shadow CNR (step 506). A subscriber profile is copied from the main CNR to the cache layer (step 508). In step 510, the cached subscriber profile is accessed, retrieved and updated by third party agents (application and service providers), so that a new version of the cached subscriber profile is created. The new version is stored in the cache layer (step 512) and may be labeled with a flag (step 513). If an error is discovered in the latest version of the cached subscriber profile, it is discarded and an older version is relabeled as the latest version (step 515).

In this embodiment, the changes to the profile corresponding to the most recent update are propagated across the various applications (step 514). An Open API can be used to push the profile changes to the applications.

In this embodiment, each dynamic caching session has a timer function that provides timer management for the cached subscriber data. Each subscriber profile may have an associated individual timer, so that each session has a limited time for a given subscriber. If the particular session timer has not expired (step 516), new versions can continue to be retrieved and updated. If the particular session timer has expired, the individual session is terminated and the latest version of the subscriber profile is stored in the main CNR (step 518).

Figure 6:
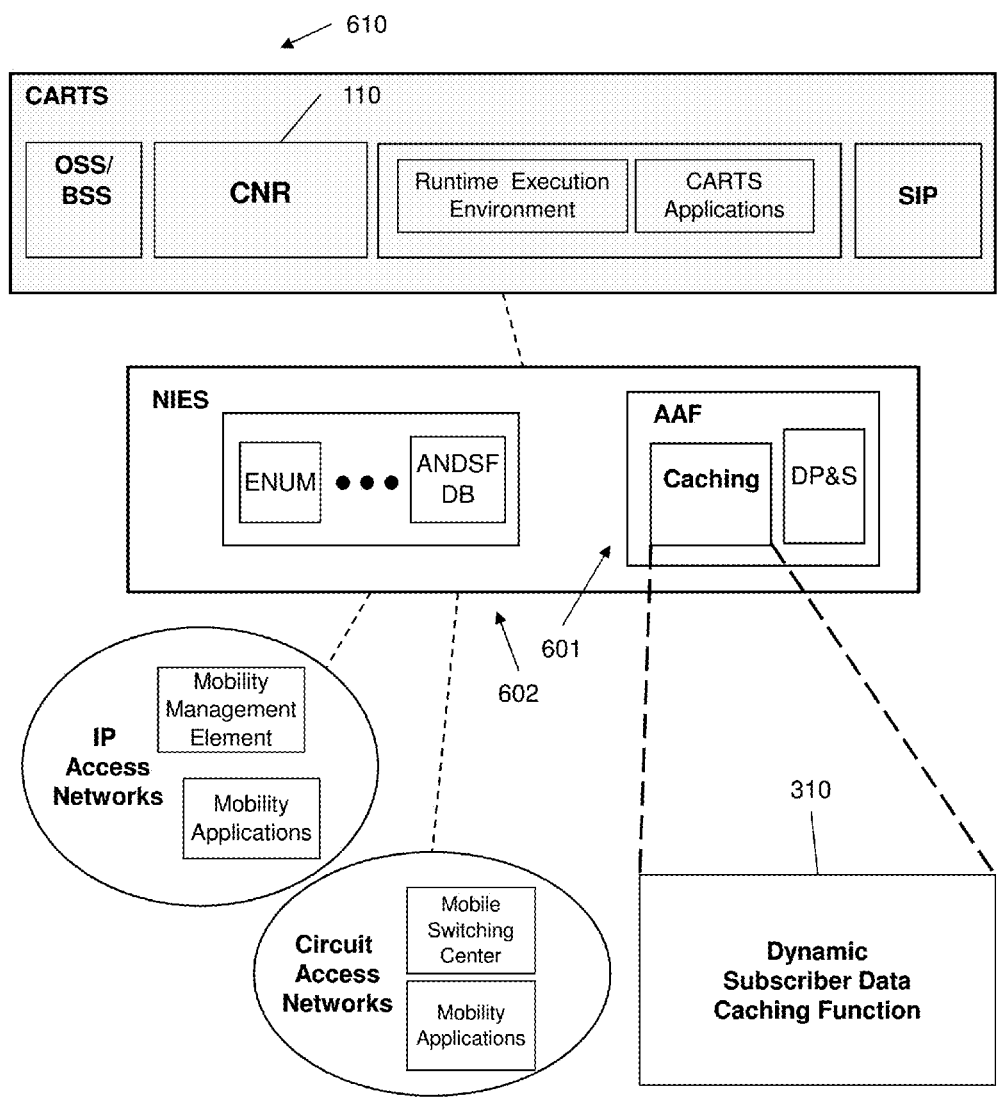
FIG. 6 schematically illustrates a network architecture including a CNR and a caching function, in accordance with an embodiment of the disclosure.

FIG. 6 illustrates an embodiment 600, in which the shadow CNR dynamic subscriber data caching function is realized as part of an access administration function (AAF) subsystem in the network integration and expansion subsystem (NIES). As shown in FIG. 6, the common architecture for real-time services (CARTS) 610 includes the main CNR 110, in addition to operations support systems and business support systems (OSS/BSS), session initiation protocol (SIP) functions, the runtime execution environment, and CARTS applications. The NIES 602 is linked to various networks including internet protocol (IP) access networks and circuit access networks. The NIES has several components including a telephone number mapping function (ENUM) and a database linked to an access network discovery and selection function (ANDSF). The NIES also includes the AAF subsystem 601 including the dynamic policy and security function (DP&S) and the dynamic subscriber data caching function 310.

Figure 7:
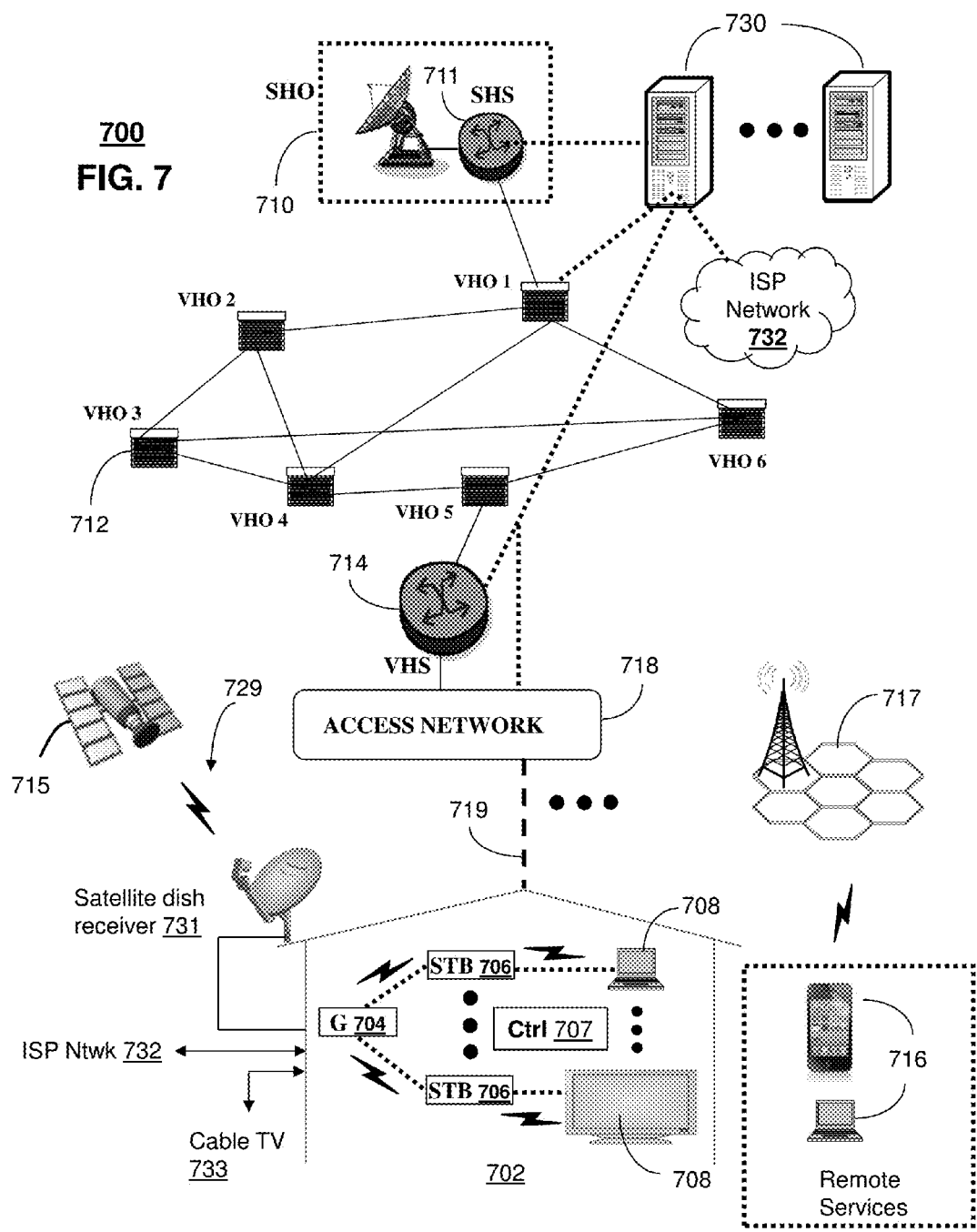
FIG. 7 depicts an illustrative embodiment of a communication system including a wireless communication network.

FIG. 7 depicts an illustrative embodiment of a first communication system 700 for delivering media content. The communication system 700 can represent a broadcast media system. Communication system 700 can be overlaid or operably coupled with network 101 as another representative embodiment of communication system 700. For instance, one or more devices illustrated in the communication system 700 of FIG. 7 can operate as a server The media system can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol.

The VHS 714 can distribute multimedia broadcast content via an access network 718 to commercial and/or residential buildings 702 housing a gateway 704 (such as a residential or commercial gateway). The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the media system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the media system and/or the satellite TV system as another representative embodiment of communication system 700. In this embodiment, the cable TV system 733 can also provide Internet, telephony, and interactive media services.

The subject disclosure can apply to other present or next generation over-the-air and/or landline media content services system.

Some of the network elements of the media system can be coupled to one or more computing devices 730, a portion of which can operate as a web server for providing web portal services over the ISP network 732 to wireline media devices 708 or wireless communication devices 716. In an embodiment, a wireless communication device 716 can be used as subscriber equipment 105 to access network 101

Communication system 700 can also provide for all or a portion of the computing devices 730 to function as a server using computing and communication technology to perform the dynamic caching function described above. Server 730 can perform, among other things, the procedure 500 described in FIG. 5. For instance, server 730 can function as a network device providing the main CNR 110, shadow CNR 210, and caching layer 410 of FIGS. 3 and 4. The media processors 706 and wireless communication devices 716 can be provisioned with software functions to utilize the services of server 730. For instance, media processors 706 and wireless communication devices 716 can be used by network subscribers as subscriber equipment 105 as shown in FIGS. 1-3.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
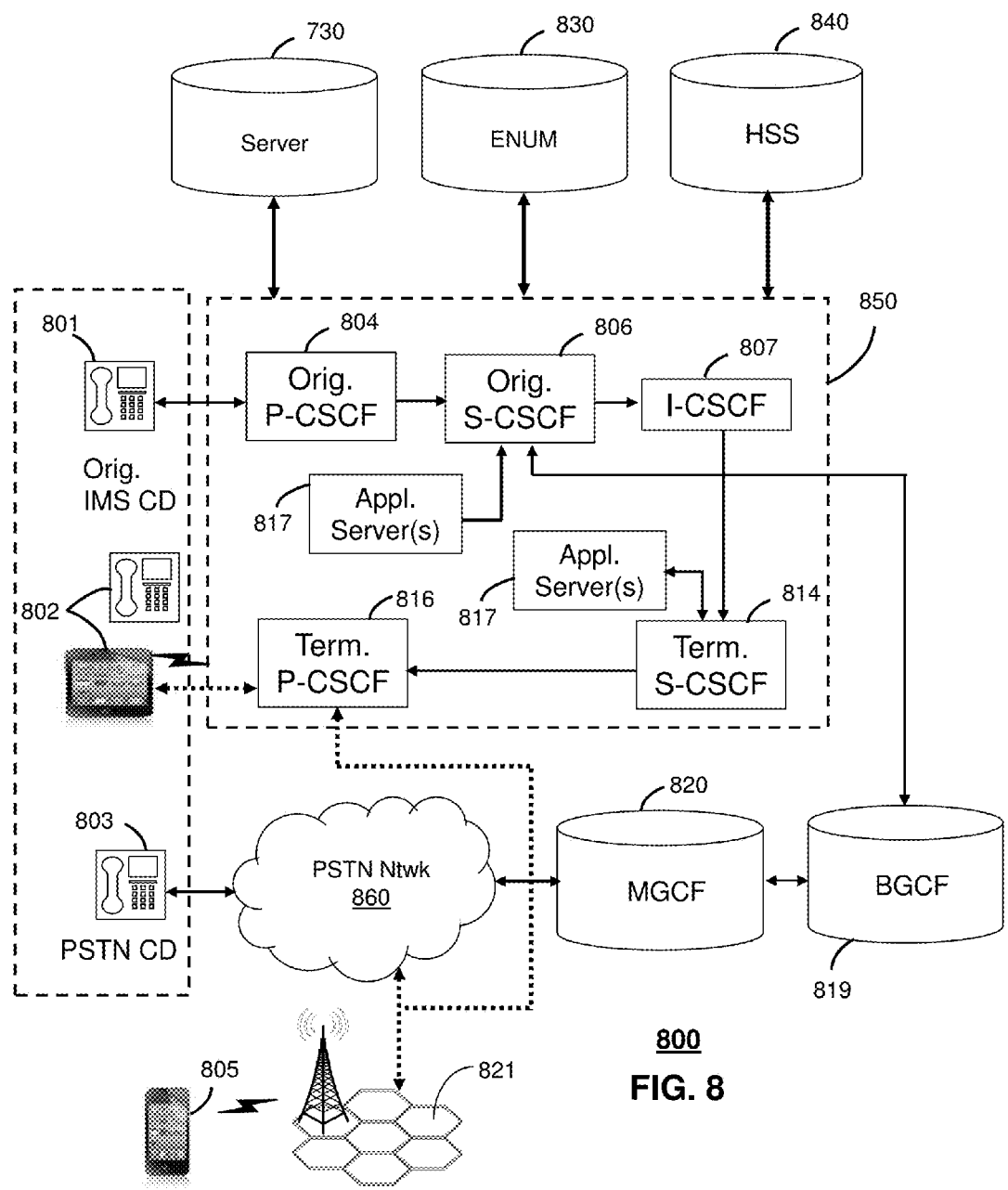
FIG. 8 depicts an illustrative embodiment of a communication system including telephone networks.

FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with network 101 (including main CNR 110, shadow CNR 210 and cache layer 410) and communication system 700 as another representative embodiment of communication system 700. In particular, this system can include a non-transitory computer-readable storage device comprising instructions which, when executed by a processor, cause the processor to perform operations. The operations comprise caching a subscriber profile in a network repository to create a cached subscriber profile. The cached subscriber profile comprises a replica of stored subscriber data. The operations also comprise updating the cached subscriber profile in accordance with subscriber use of a first application from a first application provider to produce a first updated version of the cached subscriber profile. The first updated version is accessible by the first application provider. Access to the stored subscriber data by the first application provider is prevented.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 560. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (ASs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 806 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 807 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the multimedia and Internet services of communication system 700 of FIG. 7.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 560 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a WiFi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 730 of FIG. 7 can be operably coupled to communication system 800 for purposes similar to those described above. Server 730 can perform the dynamic caching function 310 thereby provide network services to the CDs 801, 802, 803 and 805 of FIG. 8. CDs 801, 802, 803 and 805 can be adapted with software for use as subscriber equipment 105 to utilize server 730. Server 730 can be an integral part of the application server(s) 817, which can be adapted to the operations of the IMS network 850.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 9:
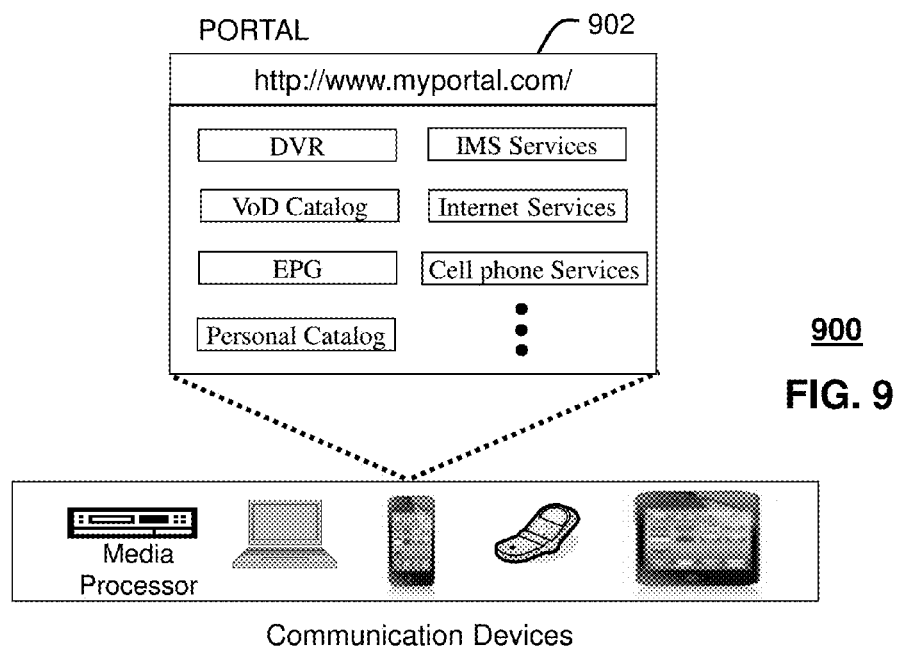
FIG. 9 depicts an illustrative embodiment of a web portal for interacting with the communication systems of FIGS. 7 and 8.

FIG. 9 depicts an illustrative embodiment of a web portal 902 of a communication system 900. Communication system 900 can be overlaid or operably coupled with network 101, communication system 700, and/or communication system 800 as another representative embodiment of communication system 700, and/or communication system 800. The web portal 902 can be used for managing services of network 101 and a server performing procedure 500, and communication systems 700-800. A web page of the web portal 902 can be accessed by a Uniform Resource Locator (URL) with an Internet browser using an Internet-capable communication device such as those described in FIGS. 7-8. The web portal 902 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 902 can also be used for provisioning IMS services described earlier, provisioning Internet services, provisioning cellular phone services, and so on.

The web portal 902 can further be utilized to manage and provision software applications and to adapt these applications as may be desired by subscribers and/or service providers 150. For instance, subscribers to network 101 can log into their on-line accounts and provision server 730 with profile 115 and additional information to enable the server to communicate with application/service providers 150. Service providers can log onto an administrator account to provision, monitor and/or maintain databases shown in FIG. 4.

Figure 10:
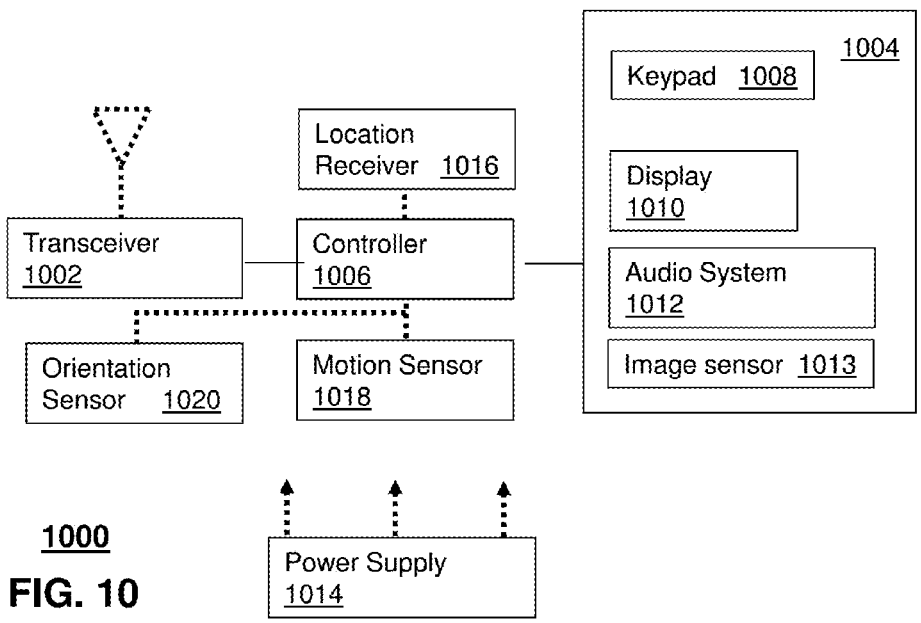
FIG. 10 depicts an illustrative embodiment of a communication device.

FIG. 10 depicts an illustrative embodiment of a communication device 1000. Communication device 1000 can serve in whole or in part as an illustrative embodiment of subscriber equipment shown in FIGS. 1-3, or the devices depicted in FIGS. 7-8.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of subscriber equipment 105, the media processor 706, the media devices 708, or the portable communication devices 716 of FIG. 7, as well as the IMS CDs 801-802 and PSTN CDs 803-805 of FIG. 8. It will be appreciated that the communication device 1000 can also represent other devices that can communicate with networks of FIGS. 1-3 and with communication systems 700-800 of FIGS. 7-8 such as a gaming console and a media player.

The communication device 1000 shown in FIG. 10 or portions thereof can serve as a representation of one or more of the devices shown in FIGS. 1-3, communication system 700, and communication system 800. In addition, the controller 1006 can be adapted in various embodiments to perform the functions of subscriber equipment 105.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
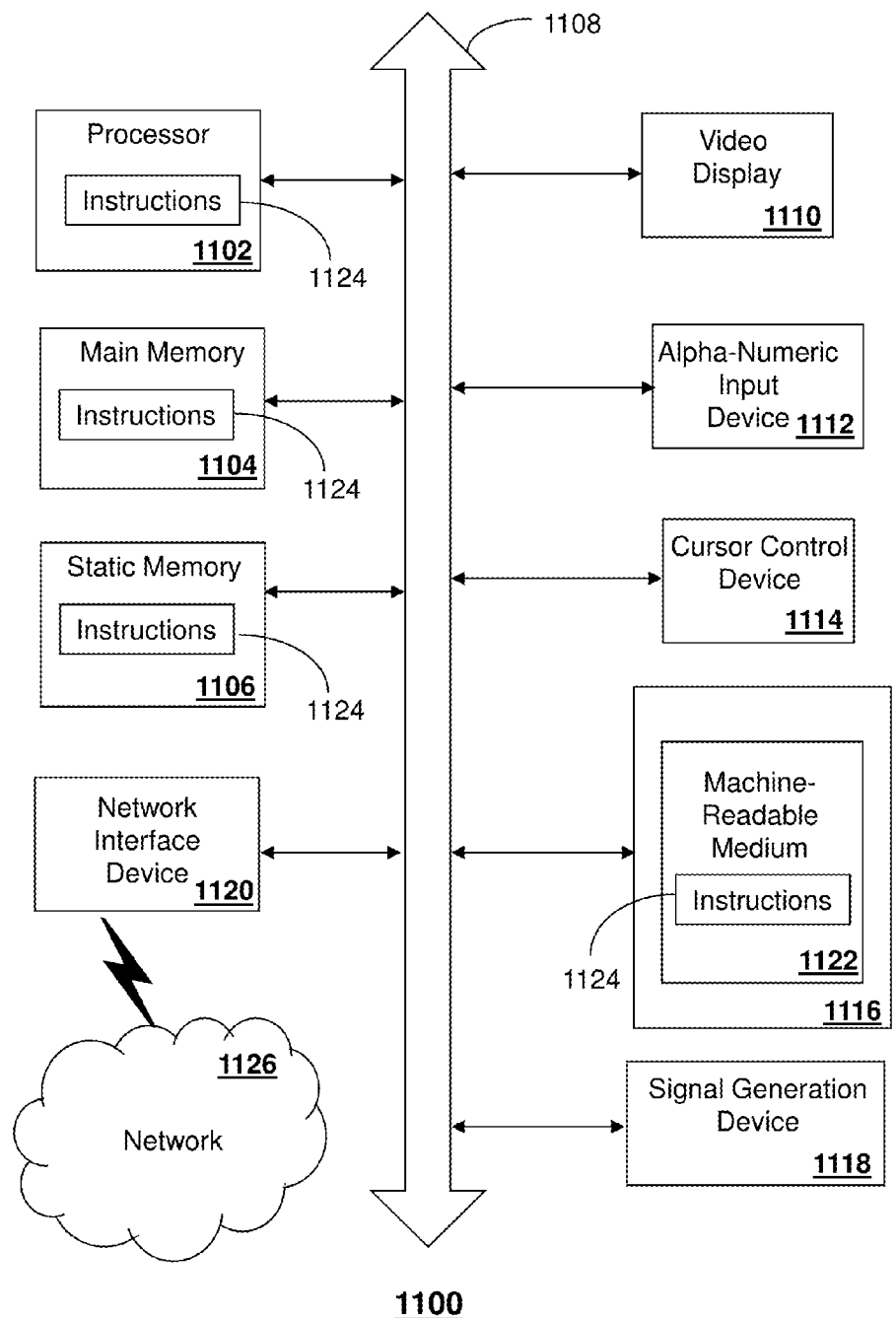
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. In particular, the machine can provide the dynamic caching function and cache layer for a shadow CNR as shown in FIGS. 3-4. One or more instances of the machine can operate, for example, as the server 730, the media processor and other devices of FIGS. 1-3 and 7-8. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    storing, by a system comprising a processor, subscriber data in a network repository of a communication network;
    caching, by the system, a subscriber profile in the network repository to create a cached subscriber profile, wherein the cached subscriber profile comprises a replica of the stored subscriber data; and
    updating, by the system, the cached subscriber profile in accordance with subscriber use of a first application from a first application provider to produce a first updated version of the cached subscriber profile,
    wherein the cached subscriber profile comprises a cache layer associated with the network repository, wherein simultaneous access to the cache layer is provided to a plurality of application service providers, and
    wherein the first updated version is accessible by the first application provider.

2. The method of claim 1, wherein access to the stored subscriber data by the first application provider is prevented.

3. The method of claim 1, wherein the cache layer is included in a hierarchy of layers.

4. The method of claim 3, further comprising managing the hierarchy of layers using a caching management scheme.

5. The method of claim 1, further comprising updating the first updated version of the cached subscriber profile in accordance with subscriber use of a second application from a second application provider to produce a second updated version of the cached subscriber profile,
    wherein the second updated version of the cached subscriber profile is accessible to the first application provider and to the second application provider.

6. The method of claim 5, further comprising providing a label for the second updated version identifying the second updated version as a new version of the cached subscriber profile.

7. The method of claim 6, further comprising storing the new version of the cached subscriber profile as updated subscriber data upon expiration of a predetermined time period.

8. The method of claim 6, further comprising providing the new version of the cached subscriber profile to the first application provider.

9. The method of claim 8, wherein the new version is provided using an open application program interface.

10. The method of claim 1, wherein the cached subscriber profile is accessed by the first application provider and the cached subscriber profile is updated in accordance with a network management policy associated with the communication network.

11. A device, comprising:
    a processor; and
    a memory that stores executable instructions that, when executed by the processor, facilitate performance of operations comprising:
    storing subscriber data in a network repository of a communication network,
    caching a subscriber profile in the network repository to create a cached subscriber profile, wherein the cached subscriber profile comprises a replica of the stored subscriber data; and
    updating the cached subscriber profile in accordance with subscriber use of a first application from a first application provider to produce a first updated version of the cached subscriber profile,
    wherein the cached subscriber profile comprises a cache layer associated with the network repository, wherein simultaneous access to the cache layer is provided to a plurality of application providers.

12. The device of claim 11, wherein the first updated version is accessible by the first application provider, and wherein access to the stored subscriber data by the first application provider is prevented.

13. The device of claim 11, wherein the cache layer is included in a hierarchy of layers, and wherein the operations further comprise managing the hierarchy of layers using a caching management scheme.

14. The device of claim 11, wherein the operations further comprise updating the first updated version of the cached subscriber profile in accordance with subscriber use of a second application from a second application provider to produce a second updated version of the cached subscriber profile,
   wherein the second updated version of the cached subscriber profile is accessible to the first application provider and to the second application provider.

15. The device of claim 14, wherein the operations further comprise providing a label for the second updated version identifying the second updated version as a new version of the cached subscriber profile.

16. The device of claim 15, wherein the operations further comprise providing the new version of the cached subscriber profile to the first application provider.

17. A non-transitory machine-readable storage medium, comprising executable instructions that, when executed by a processor, facilitate performance of operations comprising:
   storing subscriber data in a network repository of a communication network;
   caching a subscriber profile in the network repository to create a cached subscriber profile, wherein the cached subscriber profile comprises a replica of the stored subscriber data, wherein the cached subscriber profile comprises a cache layer in a hierarchy of layers associated with the network repository;
   updating the cached subscriber profile in accordance with subscriber use of an application from an application provider to produce an updated version of the cached subscriber profile;
   providing a label for the updated version identifying the updated version as a new version of the cached subscriber profile; and
   managing the hierarchy of layers using a caching management scheme, wherein simultaneous access to the cache layer is provided to a plurality of application providers.

18. The non-transitory machine-readable storage medium of claim 17, wherein access to the stored subscriber data by the application provider is prevented.

19. The non-transitory machine-readable storage medium of claim 17, wherein the operations further comprise providing the new version of the cached subscriber profile to the application provider.

20. The non-transitory machine-readable storage medium of claim 17, wherein the operations further comprise:
   upon detecting an error in the new version of the cached subscriber profile, discarding the new version; and
   providing the label to a previously produced version of the cached subscriber profile.

* * * * *